United States Patent
Yun et al.

(10) Patent No.: US 10,435,554 B2
(45) Date of Patent: Oct. 8, 2019

(54) DEGRADABLE POLYMER AND FIBER COMPONENTS

(71) Applicant: SCHLUMBERGER TECHNOLOGY CORPORATION, Sugar Land, TX (US)

(72) Inventors: Jushik Yun, Sugar Land, TX (US); Alireza Zolfaghari, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/708,182

(22) Filed: Sep. 19, 2017

(65) Prior Publication Data

US 2018/0079901 A1    Mar. 22, 2018

Related U.S. Application Data

(60) Provisional application No. 62/397,207, filed on Sep. 20, 2016.

(51) Int. Cl.
| | |
|---|---|
| *E21B 33/12* | (2006.01) |
| *C08L 63/00* | (2006.01) |
| *C09K 8/42* | (2006.01) |
| *C08L 29/04* | (2006.01) |
| *C09K 8/44* | (2006.01) |
| *E21B 33/134* | (2006.01) |
| *E21B 33/16* | (2006.01) |
| *E21B 23/01* | (2006.01) |
| *E21B 43/10* | (2006.01) |
| *E21B 43/26* | (2006.01) |
| *E21B 47/06* | (2012.01) |
| *E21B 49/00* | (2006.01) |

(52) U.S. Cl.
CPC .............. *C08L 63/00* (2013.01); *C08L 29/04* (2013.01); *C09K 8/426* (2013.01); *C09K 8/44* (2013.01); *E21B 33/12* (2013.01); *E21B 33/134* (2013.01); *E21B 33/16* (2013.01); *C09K 2208/08* (2013.01); *E21B 23/01* (2013.01); *E21B 43/10* (2013.01); *E21B 43/26* (2013.01); *E21B 47/06* (2013.01); *E21B 49/00* (2013.01)

(58) Field of Classification Search
CPC ............................... E21B 33/134; E21B 33/16
USPC ........................................................ 166/376
See application file for complete search history.

(56) References Cited

U.S. PATENT DOCUMENTS

| | | | |
|---|---|---|---|
| 5,009,826 A * | 4/1991 | Walker | ................... E21B 17/16 264/154 |
| 7,093,664 B2 | 8/2006 | Todd et al. | |
| 7,256,250 B2 | 8/2007 | Tuominen et al. | |
| (Continued) | | | |

FOREIGN PATENT DOCUMENTS

| | | |
|---|---|---|
| WO | WO2013052285 A1 | 4/2013 |
| WO | WO2013101712 A1 | 7/2013 |

OTHER PUBLICATIONS

Montserrat, S., "Effect of crosslinking density on ΔCp(Tg) in an epoxy network", 1995, 36(2), pp. 435-436.
(Continued)

*Primary Examiner* — Taras P Bemko

(57) ABSTRACT

A degradable downhole component can include a thermoset composite material that includes a thermoset resin that includes crosslinks to a water-soluble polymer and fiber.

18 Claims, 18 Drawing Sheets

(56) References Cited

U.S. PATENT DOCUMENTS

| | | |
|---|---|---|
| 8,191,633 B2 | 6/2012 | Frazier |
| 8,485,265 B2 | 7/2013 | Marya et al. |
| 2007/0107908 A1* | 5/2007 | Vaidya .................... E21B 34/14 166/376 |
| 2011/0048743 A1 | 3/2011 | Stafford et al. |
| 2011/0112241 A1* | 5/2011 | Emrick .................. C08G 18/10 524/549 |
| 2013/0048305 A1 | 2/2013 | Xu et al. |
| 2014/0190685 A1* | 7/2014 | Frazier ................ E21B 33/1208 166/250.01 |
| 2015/0167424 A1* | 6/2015 | Richards ............... E21B 33/134 166/386 |
| 2016/0230498 A1* | 8/2016 | Walton .................... E21B 33/12 |

OTHER PUBLICATIONS

West, A. R., "Formation of Li2TiO3 solid solutions by 4Li+ ⇌ Ti4+substitution", Journal of Materials Science, 1981, 16, pp. 2023-2025.

\* cited by examiner

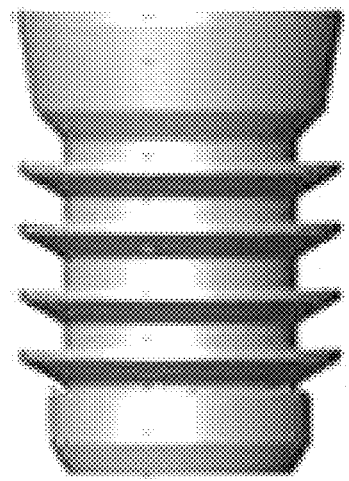
712
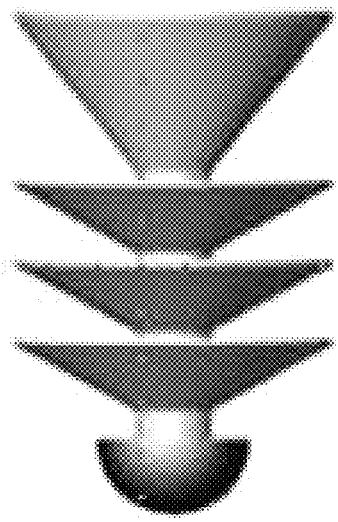
714
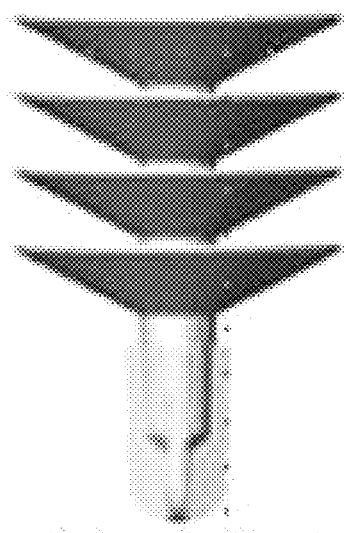
716
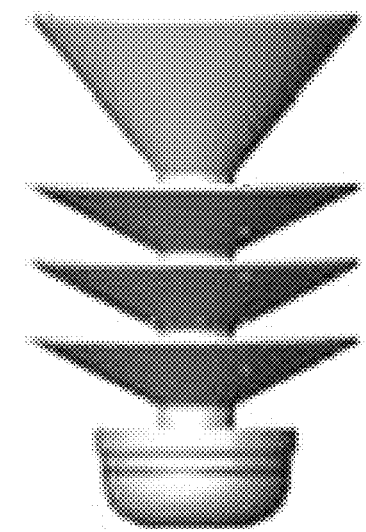
718
Fig. 7

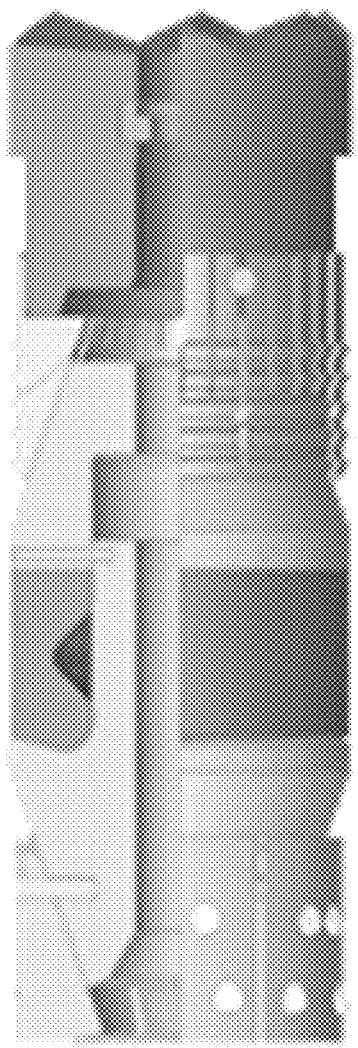 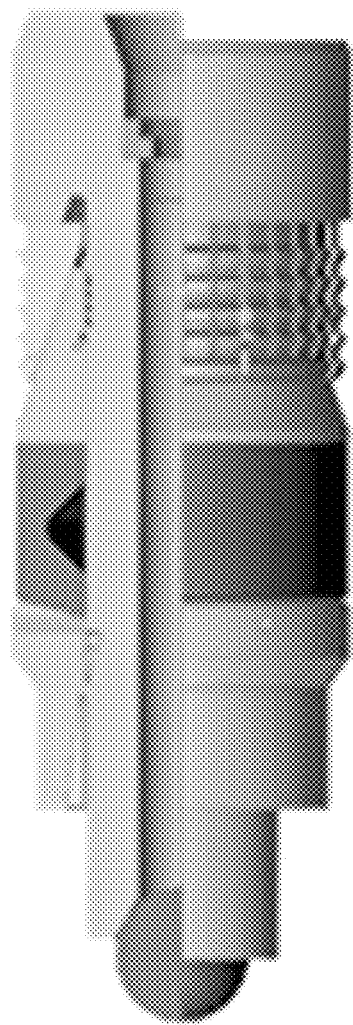
810  820
Fig. 8

1410
1420
Fig. 14

1610

| Property | Duration | Temperature °F | % |
|---|---|---|---|
| Mass loss (White) | 5 days | 300 | 32 |
| Mass loss (Black) | 5 days | 300 | 33 |
| Water absorption (white) | 5 hours | 300 | 1.0 |
| Water absorption (Black) | 5 hours | 300 | 1.1 |
| Water absorption (white) | 5 hours | 200 | 0.2 |
| Water absorption (Black) | 5 hours | 200 | 0.3 |
| Water absorption (white) | 5 hours | 350 | 2.8 |
| Water absorption (Black) | 5 hours | 350 | 2.3 |

1620

| Properties/Temperature (F) | Control | 200 5h | 300 5h | 350 5h |
|---|---|---|---|---|
| Compressive Strength (White), psi | 43395 | 49001 | 27048 | 8095 |
| Compressive Strength (Black), psi | 30770 | 42809 | 31486 | 9736 |
| Tensile strength (White), psi | 18277 | 20283 | 18183 | 6629 |
| Tensile Strength (Black), psi | 14170 | 14895 | 16102 | 7130 |

Fig. 16

DEGRADABLE POLYMER AND FIBER COMPONENTS

CROSS-REFERENCE TO RELATED APPLICATIONS

This application claims priority to and the benefit of U.S. provisional application having Ser. No. 62/397,207, filed Sep. 20, 2016 and titled DEGRADABLE POLYMER AND FIBER COMPONENTS, which is incorporated by reference herein.

BACKGROUND

Various types of materials are used in equipment, operations, etc. for exploration, development and production of resources from geologic environments. For example, equipment may be used in one or more of a sensing operation, a drilling operation, a cementing operation, a fracturing operation, a production operation, etc.

SUMMARY

A degradable downhole component can include a thermoset composite material that includes a thermoset resin that includes crosslinks to a water-soluble polymer and fiber. A method can include deploying a degradable component in a bore in a geologic formation where the degradable component includes a thermoset composite material that includes a thermoset resin that includes crosslinks to a water-soluble polymer and fiber; employing the degradable component in an operation in the bore; and degrading the degradable component via exposure to an aqueous fluid in the bore. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 7 illustrates examples of equipment;
FIG. 8 illustrates examples of equipment;
FIG. 14 illustrates example photographs;
FIG. 16 illustrates example tables.

DETAILED DESCRIPTION

Figure 1:
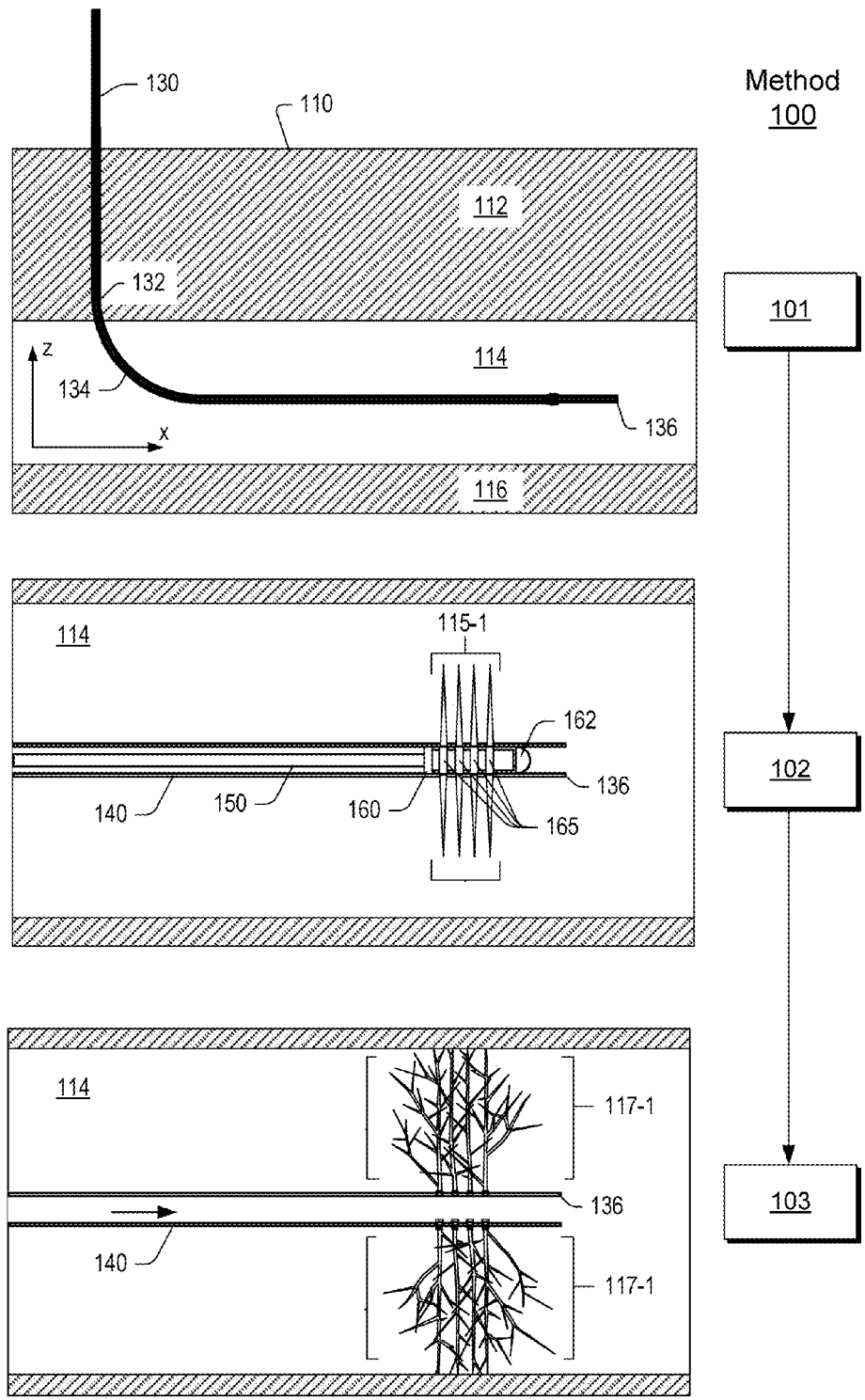
FIGS. 1 and 2 illustrate an example of a method and examples of equipment for fracturing a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a material or materials may be processed to form processed material. In such an example, the processed material may be compressed, machined, formed, etc. to produce a part or parts. As an example, a part may be a component or a portion of a component. A part may be included in equipment, which may be suitable for use in an environment such as, for example, a downhole environment. As an example, equipment may be drilling equipment, cementing equipment, fracturing equipment, sampling equipment, or other type of equipment. As an example, equipment may be borehole equipment. As an example, a tool may be a borehole tool, for example, suitable to perform a function or functions in a downhole environment in a borehole.

As to cementing equipment, such equipment may be used in one or more downhole cementing operations. As an example, cement may be placed adjacent to a liner. As an example, a liner may be a string of casing in which the top does not extend to the surface but instead is suspended from inside another casing string. As an example, a liner hanger may be used to attach or hang one or more liners from an internal wall of another casing string.

As an example, a method may include operating one or more components of a liner hanger system. As an example, a lower completion may be a portion of a well that is at least in part in a production zone or an injection zone. As an example, a liner hanger system may be implemented to perform one or more operations associated with a lower completion, for example, including setting one or more components of a lower completion, etc. As an example, a liner hanger system may anchor one or more components of a lower completion to a production casing string.

As an example, equipment may include one or more plugs, one or more seats that can receive a respective plug, etc. In such an example, it may be desirable that a plug and/or a seat have properties suited for one or more operation or operations. Properties may include mechanical properties and may include one or more other types of properties (e.g., chemical, electrical, etc.). As an example, it may be desirable that a plug and/or a seat degrade. For example, a plug and/or a seat may be manufactured with properties such that the plug and/or the seat degrade when exposed to one or more conditions. In such an example, where the plug acts to block a passage, upon degradation, the passage may become unblocked. As an example, a component (e.g., a plug, a seat, a grip, etc.) may degrade in a manner that facilitates one or more operations. As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part. For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and can also include one or more degradable plugs (e.g., balls, cylinders, etc.).

As an example, at least a portion of a borehole tool may be broken via interaction with a tool where at least some of resulting pieces are degradable. For example, a tool may apply force (e.g., drilling force or other force) to a plug, a plug tool, a grip, etc. such that the applied forces cause breaking into pieces of at least a portion of the plug, at least a portion of the plug tool, at least a portion of the grip, etc. In such an example, the pieces may be relatively large and degrade to relatively small pieces (e.g., which may pass through one or more openings, etc.).

As an example, equipment may include one or more elastomeric components. An elastomer can be defined as being a polymeric material characterized by at least some amount of viscoelasticity (e.g., viscosity and elasticity). As an example, an elastomer can have a relatively low Young's modulus and, for example, a relatively high failure strain compared to various other materials. An example of an elastomer is rubber, which can include vulcanizates.

In an elastomer, monomers can be linked to form a backbone, chains, a network, etc. As an example, an elastomer can include one or more of carbon, hydrogen, oxygen and silicon. Elastomers may be characterized as being amorphous polymeric materials that exist above their glass transition temperature, for example, such that considerable segmental motion is possible.

As an example, a pipe may be a casing such as, for example, a low alloy steel (LAS) casing. Alloy steel is steel that is alloyed with a variety of elements in total amounts between about 1.0 percent and about 50 percent by weight, for example, to enhance mechanical properties. Alloy steels may be classified as being low alloy steel or high alloy steel, which may defined using a weight percent of alloy of about 4 percent to about 8 percent. Alloy steel alloyants may include, for example, one or more of manganese, nickel, chromium, molybdenum, vanadium, silicon, boron, aluminum, cobalt, copper, cerium, niobium, titanium, tungsten, tin, zinc, lead, and zirconium.

As an example, a high-strength low alloy steel (HSLAS) may have a yield strength greater than about 250 MPa or about 36 ksi. HSLAS can be suitable for use in oil and/or gas pipelines. As an example, HSLAS AISI 4130 (e.g., or modification thereof) may be utilized for pipe, tubing, liner, casing, etc. in a well. Composition of AISI 4130 can be, for example, within ranges as follows by weight percentage: C 0.28-0.33; Cr 0.8-1.1; Fe 97.3-98.2; Mn 0.4-0.6; Mo 0.15-0.25; P Max 0.035; S Max 0.04; Si 0.15-0.35. As an example, AISI 4130 may have a Vickers hardness of about 207 (e.g., Brinell hardness of about 197) and a yield strength of about 435 MPa (e.g., about 63 ksi). As an example, 316L stainless steel can exhibit a Vickers hardness of about 140; whereas diamond can exhibit a Vickers hardness of about 10,000. As an example of another hard material, consider martensite with a Vickers hardness of about 1,000; noting that hard crystalline or polycrystalline materials may fracture rather than "indent" (e.g., exhibit an indentation fracture hardness).

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures. As an example, activation may occur with respect to a pre-existing feature such as a fault or a fracture. As an example, a pre-existing fracture network may be at least in part activated via a method that includes applying fluid pressure in a subterranean environment. The foregoing method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 2:
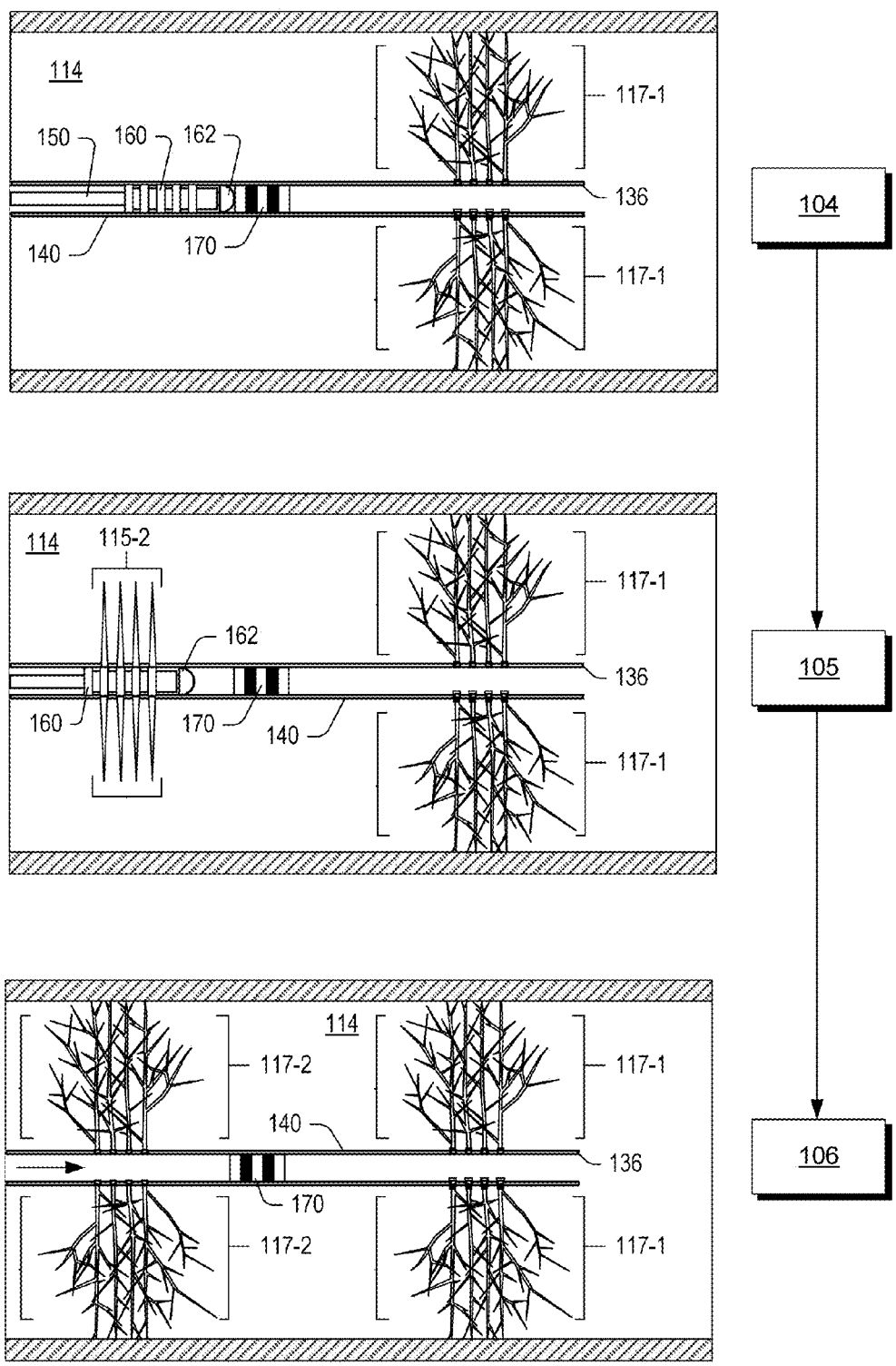

FIGS. 1 and 2 show an example of a method 100 that includes generating fractures. As shown, the method 100 can include various operational blocks such as one or more of the blocks 101, 102, 103, 104, 105 and 106. The block 101 may be a drilling block that includes drilling into a formation 110 that includes layers 112, 114 and 116 to form a bore 130 with a kickoff 132 to a portion defined by a heel 134 and a toe 136, for example, within the layer 114.

As illustrated with respect to the block 102, the bore 130 may be at least partially cased with casing 140 into which a string or line 150 may be introduced that carries a perforator 160. As shown, the perforator 160 can include a distal end 162 and charge positions 165 associated with activatable charges that can perforate the casing 140 and form channels 115-1 in the layer 114. Next, per the block 103, fluid may be introduced into the bore 130 between the heel 134 and the toe 136 where the fluid passes through the perforations in the casing 140 and into the channels 115-1. Where such fluid is under pressure, the pressure may be sufficient to fracture the layer 114, for example, to form fractures 117-1. In the block 103, the fractures 117-1 may be first stage fractures, for example, of a multistage fracturing operation.

Per the block 104, additional operations are performed for further fracturing of the layer 114. For example, a plug 170 may be introduced into the bore 130 between the heel 134 and the toe 136 and positioned, for example, in a region between first stage perforations of the casing 140 and the heel 134. Per the block 105, the perforator 160 may be activated to form additional perforations in the casing 140 (e.g., second stage perforations) as well as channels 115-2 in the layer 114 (e.g., second stage channels). Per the block 106, fluid may be introduced while the plug 170 is disposed in the bore 130, for example, to isolate a portion of the bore 130 such that fluid pressure may build to a level sufficient to form fractures 117-2 in the layer 114 (e.g., second stage fractures).

In a method such as the method 100 of FIGS. 1 and 2, it may be desirable that a plug (e.g., the plug 170) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid).

Figure 3:
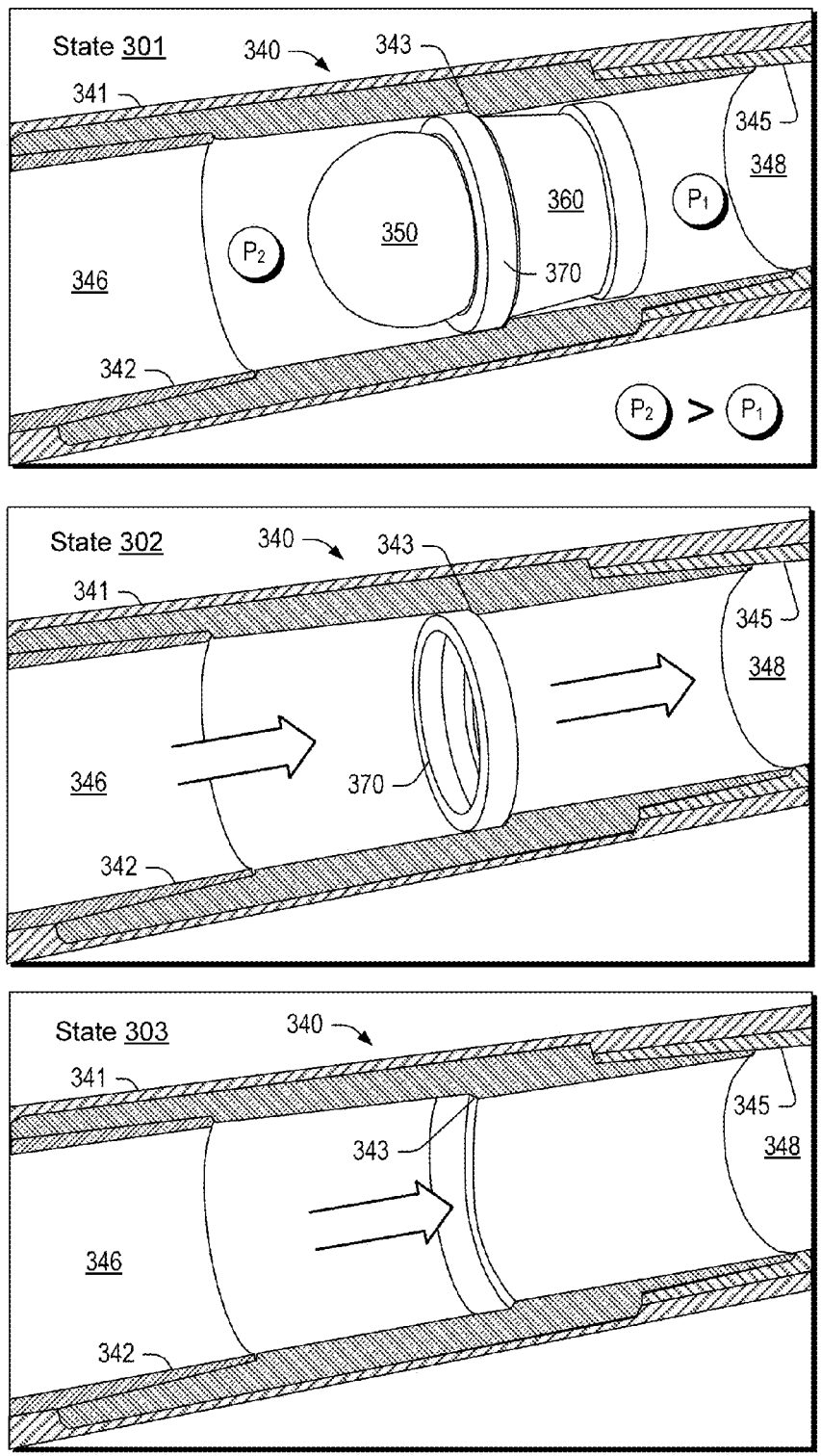
FIG. 3 illustrates an example of equipment in various example operational states.

FIG. 3 shows an example of equipment in various states 301, 302 and 303. As shown, the equipment can include a casing 340 that include various components 341, 342, 343 and 345. For example, the component 342 may define a bore 346 and the component 345 may define a bore 348 where the component 343 includes features (e.g., reduced diameter, conical shape, receptacle, etc.) that can catch a ring component 370 that is operatively coupled to a plug component 360 where the ring component 370 and the plug component 360 may position and seat a plug 350 in the casing 340. As an example, a seal may be formed by the plug 350 with respect to the plug component 360 and/or the ring component 370 and, for example, a seal may be formed by the ring component 370 with respect to the component 343. In such an approach, the seals may be formed in part via fluid pressure in a manner where increased pressure acts to increase seal integrity (e.g., reduce clearances that may be subject to leakage). As an example, the ring component 370 may be an upper component (e.g., a proximal component) of a plug seat and the plug component 360 may be a lower component (e.g., a distal component) of the plug seat.

As shown in the state 301, the plug 350 may be seated such that the bore 346 (e.g., of a first zone) is separated (e.g., isolated) from the bore 348 (e.g., of a second zone) such that fluid pressure in the bore 346 (see, e.g., $P_2$) may be increased to a level beyond fluid pressure in the bore 348 (see, e.g., $P_1$). Where the plug 350 and the plug component 360 are degradable, for example, upon contact with fluid that may pressurize the bore 348, degradation of the plug 350 and the plug component 360 may transition the equipment from the state 301 to the state 302. As shown in the state 302, fluid may pass from the bore 346 to the bore 348, for example, via an opening of the ring component 370. Where the ring component 370 is degradable, for example, upon contact with fluid in the bore 346, degradation of the ring component 370 may transition the equipment from the state 302 to the state 303. In the state 303, the casing 340 may be the remaining equipment of the state 301 (e.g., the plug 350, the plug component 360 and the ring component 370 are at least in part degraded).

As an example, the plug 350, the plug component 360 and the ring component 370 may be components of a dissolvable plug and perforation system that may be used to isolate zones during stimulation (see, e.g., the method 100 of FIGS. 1 and 2). Such equipment may be implemented in, for example, cemented, uncemented, vertical, deviated, or horizontal bores (e.g., in shale, sandstone, dolomite, etc.).

As an example, the plug component 360 and the ring component 370 may be conveyed in a bore via a pump down operation (e.g., which may move the components 360 and 370 along a bore axis direction). As an example, a component or components may include adjustable features, for example, that allow a change in diameter to facilitate seating in a receptacle disposed in a bore. For example, a tool may interact with a component or components to cause a change in diameter or diameters (e.g., a change in form of one or more components). In the changed state, the component or components may catch and seat in a receptacle disposed in a bore (e.g., seat in a shoulder of a receptacle component).

As an example, the plug component 360 and the ring component 370 may be seated in a receptacle by a tool that may include one or more perforators. Once seated, the tool may be repositioned to perforate casing and form channels (e.g., in a layer or layers of rock). As an example, repositioning may occur multiple times, for example, to form multiple sets of perforations and multiple sets of channels. As an example, after perforating and channel formation, the plug 350 may be pumped down to contact the plug component 360 and/or the ring component 370, for example, to form a seal that can isolate one zone from another zone (e.g., one interval from another interval). Fluid pressure may be increased in an isolated zone as defined by the plug 350, the plug component 360 and the ring component 370 as positioned in a receptacle disposed in a bore such that the fluid enters channels via perforations of the isolated zone and generates fractures (e.g., new fractures, reactivated fractures, etc.).

As an example, a degradable thermoset material can be included in one or more downhole tools. A thermoset is a type of material that includes polymers that can cross-link together during curing to form chemical bond.

As an example, one or more cross-linking agents may be utilized, which may be selected based on properties. For example, where degradation in an aqueous environment (e.g., a saline environment) is desirable, a cross-linking agent that degrades in such an aqueous environment may be utilized. As an example, a cross-linking agent or agents can provide strength through cross-linking where a component may be utilized at that strength and then degrade due to one or more degradation mechanisms.

As an example, one or more fibers may be utilized that can impart mechanical properties such as, tensile and/or compressive strength. As an example, a fiber may be a degradable fiber that may degrade in an aqueous environment (e.g., a saline environment). As an example, fibers may be of one or more lengths. As an example a fiber may wrap at least a portion of a component. As an example, a fiber may be a glass fiber such as an E-glass fiber (e.g., with tensile strength of about 3445 MPa and compressive strength of about 1080 MPa and a density of about 2.58 g/cm$^3$).

As an example, glass fibers may be made of one or more of various types of glass. Such glasses can include silica or silicate, for example, with varying amounts of oxides of calcium, magnesium, and sometimes boron.

E-glass is an alumino-borosilicate glass, for example, with less than about 1% w/w alkali oxides. Some examples of other types of glass include A-glass (alkali-lime glass with little or no boron oxide), E-CR-glass (electrical/chemical resistance; alumino-lime silicate with less than about 1% w/w alkali oxides, with high acid resistance), C-glass (alkali-lime glass with high boron oxide content, used for glass staple fibers and insulation), D-glass (borosilicate glass, named for its low dielectric constant), R-glass (alumino silicate glass without MgO and CaO with high mechanical requirements as reinforcement), and S-glass (alumino silicate glass without CaO but with high MgO content with high tensile strength).

E-glass ("E" because of initial Electrical application), is alkali free and tends to be susceptible to chloride ion attack (e.g., consider exposure to salt water). S-glass ("S" for "stiff") may be used when tensile strength (high modulus) is desired; noting that R-glass, "R" for "reinforcement" may be a designator. C-glass ("C" for "chemical resistance") and T-glass ("T" is for "thermal insulator" may resist some types of chemical attack. C-glass was developed to resist attack from chemicals, mostly acids that destroy E-glass.

As an example, chloride ions can be used to attack and dissolve E-glass. In such an example, E-glass fiber may provide a mechanism that acts to degrade a component. As an example, a component may degrade via one or more mechanisms. As an example, one mechanism can be organic and another mechanism can be inorganic. As an example, glass fiber may be utilized as short fibers and/or as one or more filament where such fibers and/or one or more filaments may optionally be degradable, for example, in an aqueous solution (e.g., a salt solution that includes chloride ions, etc.).

As an example, fibers and/or one or more filaments may be coated with one or more polymeric materials. In such an example, at least one of the polymeric materials can be degradable in an aqueous environment where the fibers and/or one or more filaments may then be exposed to the aqueous environment and, for example, begin to degrade. For example, consider polymeric coated E-glass fibers or a polymeric coated E-glass filament where one mechanism degrades the coating and another mechanism degrades the E-glass. In such an example, the mechanisms may be tailored via one or more parameters (e.g., type or types of polymeric material(s), thickness of coating, thickness of E-glass, etc.). In such an example, strength may be tailored and associated with a time frame to allow for performance of one or more downhole operations prior to loss of strength due to degradation via one or more mechanisms.

As an example, a degradable material can include one or more of epoxy, phenolic resin, polyester, polyurethane, silicone, urea-formaldehyde, melamine-formaldehyde, crosslinked PGA (polyglycolic acid) and crosslinked polylactic acid and optionally one or more other types of polymeric materials.

As an example, one or more aliphatic epoxy resins may be utilized. For example, consider one or more epoxy resins formed by glycidylation of aliphatic alcohols or polyols. Resulting resins may be monofunctional (e.g. dodecanol glycidyl ether), difunctional (butanediol diglycidyl ether), or higher functionality (e.g. trimethylolpropane triglycidyl ether). Various resins may display low viscosity at room temperature (10-200 mPa·s). One example of a class of resins is cycloaliphatic epoxy resins, which include one or more cycloaliphatic rings (e.g., 3,4-epoxycyclohexylmethyl-3,4-epoxycyclohexane carboxylate). This class also displays low viscosity at room temperature, but offers higher temperature resistance than aliphatic epoxy diluents. Curing can involve one or more suitable accelerators.

As an example, one or more cross-linking agents can include a polyvinyl alcohol (PVA). Vinyl polymers tend to be insoluble or relatively insoluble in water. PVA is soluble due to hydroxyl groups (OH—), which can allow for formation of colloidal suspension in water because such groups can participate in hydrogen bonding.

As an example, a thermoset composite material can include, for example, one or more of polyvinyl alcohol (PVA), polylactic acid (PLA), polycarprolacton, polyglycolic acid (PGA), polylactic-co-polyglcolic acid (PLGA).

The material properties of thermosets can depend on molecular structures of constituent resin monomers and cross-linker molecules (e.g., cross-linking agent or agents). For example, Tg of an epoxy network can be shifted by more than 100 degrees C. via selection of cross-linking agent. As an example, Tg values can decrease with increasing chain length of a cross-linking agent. Fracture toughness of epoxy thermosets may exhibit a maximum value for conversion degrees between about 65 percent and about 95 percent, for example, depending on the rigidity of the cross-linking agent or agents.

As an example, a thermoset composite component can deliver high strength with controlled disintegration when subjected to certain conditions. As an example, such a component can be dissolved when and where desired with, for example, minimal debris after dissolution (e.g., to complete a downhole operation, etc.).

Various example thermoset composites can provide for formation of relatively high compressive and tensile strength degradable components. For example, consider one or more components for downhole applications such as degradable frac ball, frac plug, cementing plug, etc. Such components may be used in operational conditions that include high pressure (e.g., about 10,000 psi or more) and high temperature (e.g., about 300 degrees F. or more).

As an example, a composite structure can be formulated and made into a component that can degrade in a neutral solution, optionally without inclusion of a degradation catalyst. In such an example, the composite structure can be made into a component where a filament (e.g., a fiber) is wound about and/or into a degradable crosslinked thermoset. In such an example, the filament can be made of one or more types of material. For example, consider one or more of dissolvable cellulose fiber, dissolvable glass fiber, dissolvable ceramic, and dissolvable metallic fiber. As an example, such fiber or fibers may be short segments that are included in a thermoset matrix.

As an example, a cross-linkable polymer matrix can be modified with one or more elastomers or elastomeric elements. As an example, a fiber or fibers may be elastomeric in that they can extend and/or shorten in length. As an example, a high strength degradable composite structure can be formed as a fracturing plug, a bridge plug, a cementing plug for CLG, a high temperature degradable fiber for WSC, etc.

As an example, cross-linking of linear polymers can occur in a polymer mixture to form a network that may be suited to high performance applications. As an example, compressive yielding and cross-linking can relate to chain flexibility and intermolecular interactions. An increase of cross-linking density can reduce chain mobility and, consequently, increases the compressive yielding.

Example thermoset composites exhibited mechanical performance in brine at high temperatures up to about 350 degrees F. These example thermoset composites retained mechanical integrity in about 3 percent KCl solution for about 5 hours at about 300 degrees F. and degraded at about 300 degrees F., losing their compressive strength completely after about 5 days; noting that mechanical tests were carried out at room temperature.

TABLE 1

Mechanical strengths (ksi) of thermoset composites before and after soaking in aqueous environment (about 3 percent KCl solution).

| Time | Control | 5 h | 5 h | 5 h | 5 days |
|---|---|---|---|---|---|
| Temperature (F.) | RT | 200 | 300 | 350 | 300 |
| Compressive Strength, ksi | 43.4 | 49.0 | 27.0 | 8.1 | 0 |
| Tensile strength, ksi | 18.3 | 20.2 | 18.2 | 6.6 | 0 |

Dynamic Mechanical Analysis (DMA) of the composites at different temperatures revealed stability in the storage modulus of the composite up to about 350 degrees F.

TABLE 2

Storage modulus (GPa) of the composite examples.

| Sample | E' (Storage Modulus) @ 75° F. | E' (Storage Modulus) @ 200-350° F. |
|---|---|---|
| Degradable thermoset composites | 6 | 5 |
| Other, epoxy composite | 6 | 6 |

The degradable thermoset composite exhibited higher mechanical properties when compared to composite materials for a fracturing plug, as shown in Table 3.

TABLE 3

Mechanical properties of degradable thermoset composites.

| Property | Degradable thermoset composites | Other, epoxy composite |
|---|---|---|
| Glass content | 55 | 80 |
| Tensile strength (ksi) | 18 | 10 |
| Compressive strength (ksi) | 43 | 30 |

An increase in cross-linking density can reduce chain mobility and hence increase temperature of glass transition, Tg. The increase in Tg correlates to higher compressive strength at elevated temperatures. A degradable thermoset can provide thermoset properties such as high compressive and tensile strengths at elevated temperature with degradability (e.g., as in degradable thermoplastics).

As an example, a high strength degradable polymer composite structure can be formed that targets applications with pressures that may be equal to or greater than about 10,000 psi and, for example, with temperature equal to or greater than about 300 degrees F. As an example, consider a fracturing operations ball or plug, a cementing operations ball or plug and one or more other types of degradable downhole parts.

As an example, a structure matrix can include soluble and/or non-soluble fiber, fine powder, metal alloy fiber and thermosets. As an example, a water-soluble crosslinking agent can be included.

As an example, a degradable composite matrix can include crosslinkable epoxy with reinforcement materials where content of reinforcement may be up to about 80 percent by weight. As an example, a component may be formed via a continuous fiber wetting composite manufacturing process. For example, fibers may be wetted with material and wound, pressed, etc. to form a component.

As an example, a continuous fiber wetting may be utilized where wetting may be polymeric wetting. As an example, a manufacturing process may include one or more of compression molding, transfer molding and injection molding (e.g., with short fibers reinforcement, etc.).

As an example, a structure can be reinforced with dissolvable reinforcement material, such as one or more of dissolvable glass fiber, dissolvable cellulose fiber, dissolvable glass bead, dissolvable ceramics fiber, dissolvable ceramics powders, dissolvable metallic fiber or, for example, powders to leave very low debris after a dissolution process.

As an example, a degradation rate of a structure may be tuned via dimension or dimensions (e.g., thickness), chemical inhibitors/accelerators (such as MgO or ZnO or $H_2BO_3$) of one or more portions (e.g., outer/inner layers, etc.) and/or degree of cure of matrix in composite structure.

As an example, shape of a crosslinkable degradable composite part could be tubular, conical or spherical. As an example, consider a degradable composite component as a plug ball, a plug, a bridge plug or a stage cementing tool or another type of degradable structure (e.g., tubular structure component in downhole application, etc.).

Figure 4:
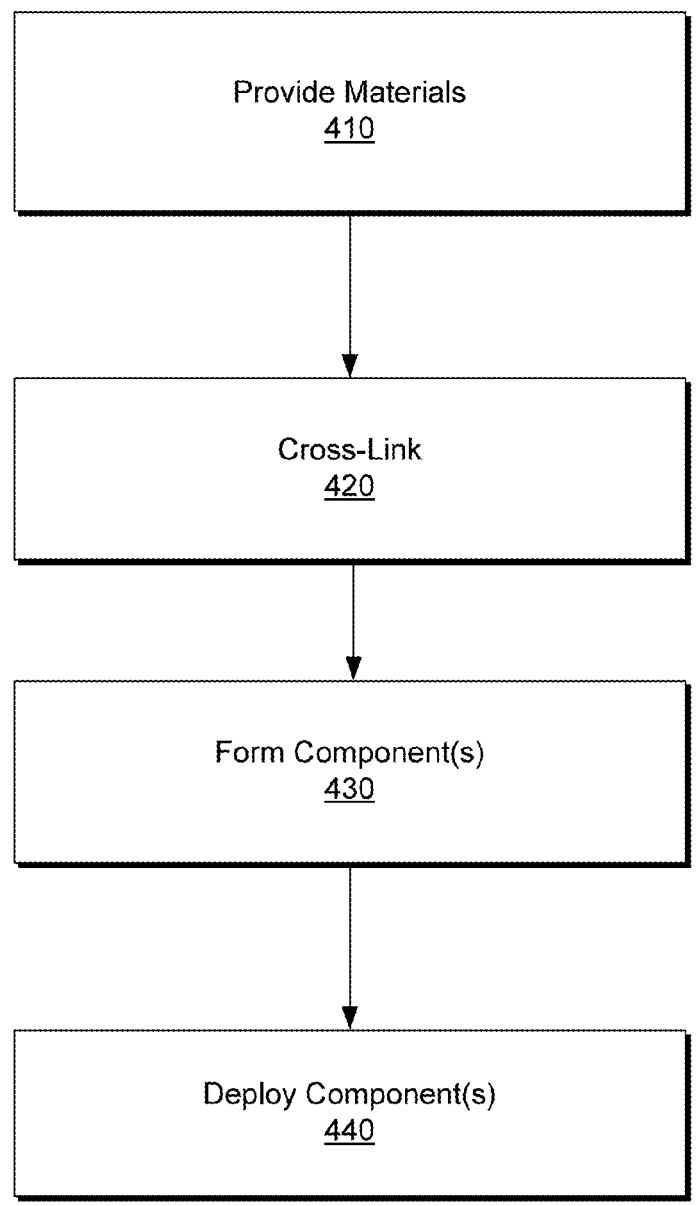
FIG. 4 illustrates an example of a method.

FIG. 4 shows an example of a method 400 that includes a provision block 410 for providing materials that include polymeric materials, a cross-link block 420 for cross-linking polymeric materials, a formation block 430 for processing materials to form one or more components and a deployment block 440 for deploying one or more components, for example, as formed per the formation block 430 and optionally one or more additional components.

As an example, one or more degradable components may be implemented in one or more tools, pieces of equipment, etc. As an example, an operation that performs multistage stimulation may employ one or more degradable elements, optionally as triggering components. For example, degradation of an element may trigger slippage of one or more components with respect to one or more other components.

Figure 5:
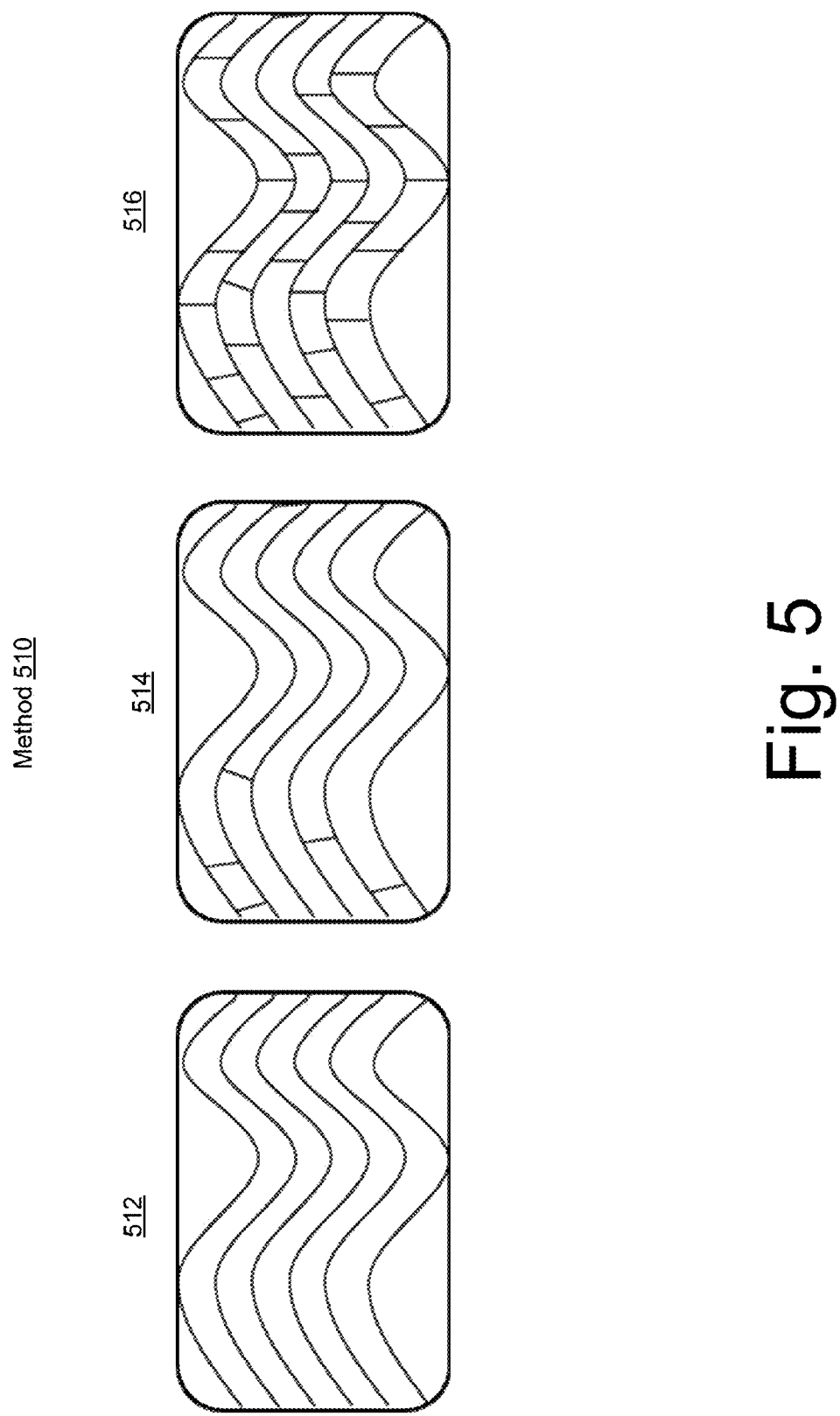
FIG. 5 illustrates an example of a method.

FIG. 5 shows a method 510 that includes cross-linking of polymeric materials via graphics 512, 514 and 516. As shown, the graphic 512 does not include cross-links while the graphics 514 and 516 include cross-links where a number of cross-links for the graphic 516 exceeds a number of cross-links for the graphic 514.

Figure 6:
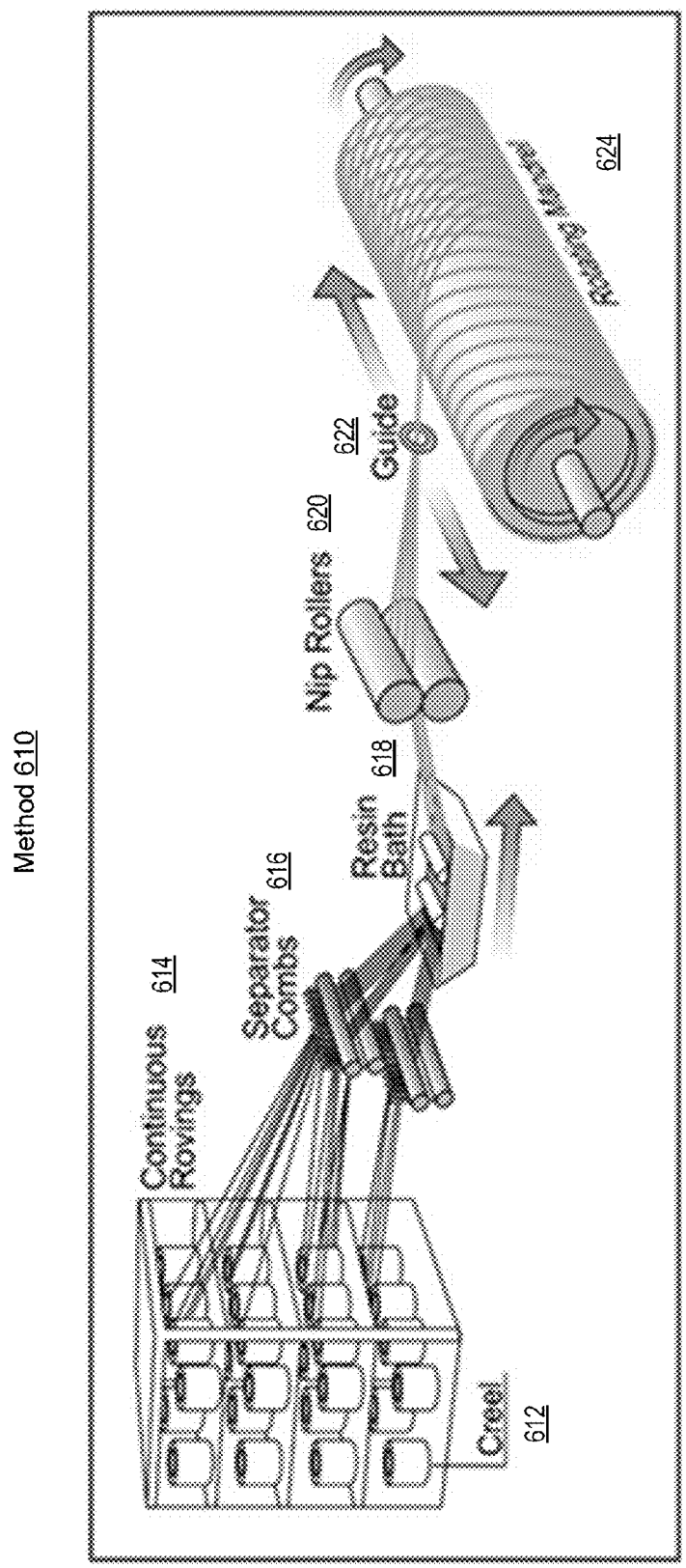
FIG. 6 illustrates an example of a method.

FIG. 6 shows an example of a method 610 that includes equipment for fiber (e.g., filament) winding. As an example, fiber may be wound onto a polymeric material to increase strength of the polymeric material. As an example, a fiber may be degradable. For example, a fiber can include one or more water degradable components.

FIG. 7 shows various examples of plugs 712, 714, 716 and 718. Such plugs can be cementing plugs (e.g., closing 712, first stage sealing 714, first stage shut-off 716, by-pass 718, etc.).

FIG. 8 shows examples of equipment 810 and 820 where one or more components of the equipment can be formed of a degradable thermoset composite material.

Figure 9:
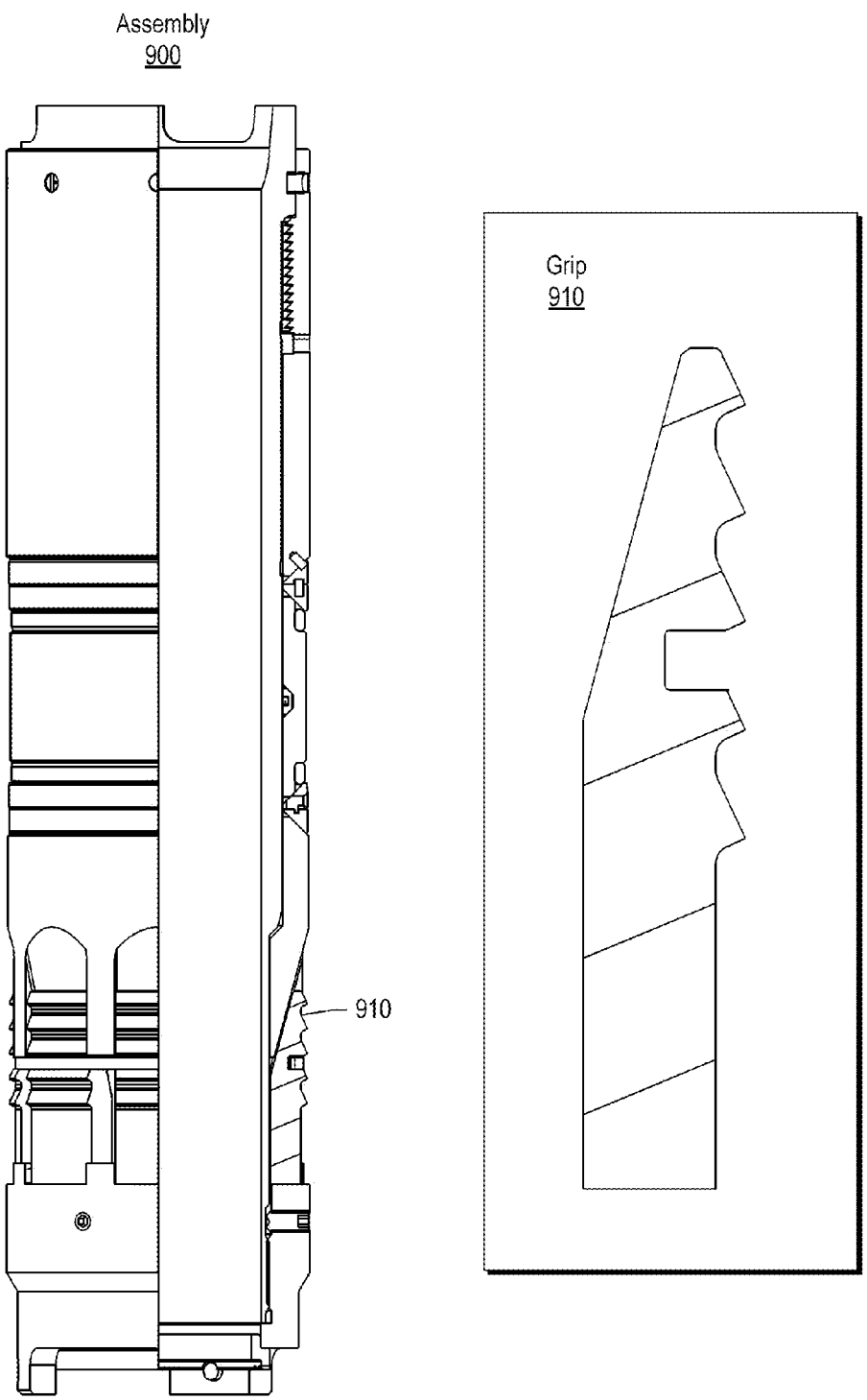
FIG. 9 illustrates examples of equipment.

FIG. 9 shows an example of equipment 900 that includes grips 910. In such an example, at least a portion of the equipment 900 can include water degradable material such as, for example, a water degradable thermoset composite material.

Figure 10:
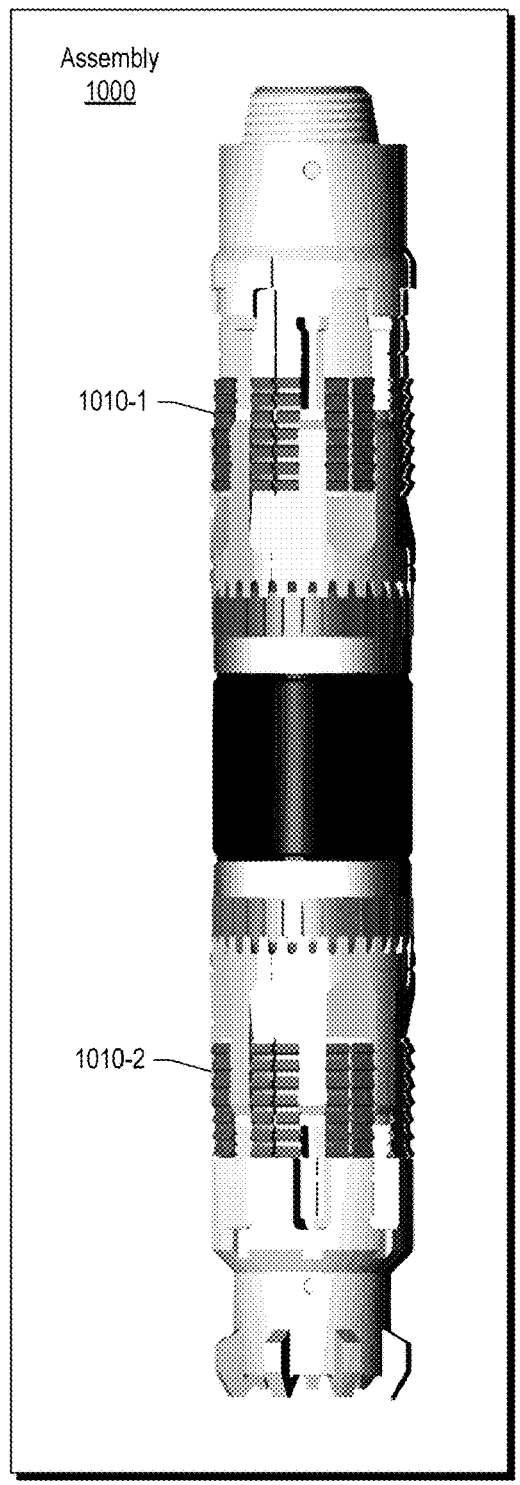
FIG. 10 illustrates examples of equipment.

FIG. 10 shows an example of an assembly 1000 that include sets of grips 1010-1 and 1010-2. In the example of FIG. 10, the assembly 1000 can include one or more non-degradable portions.

Figure 11:
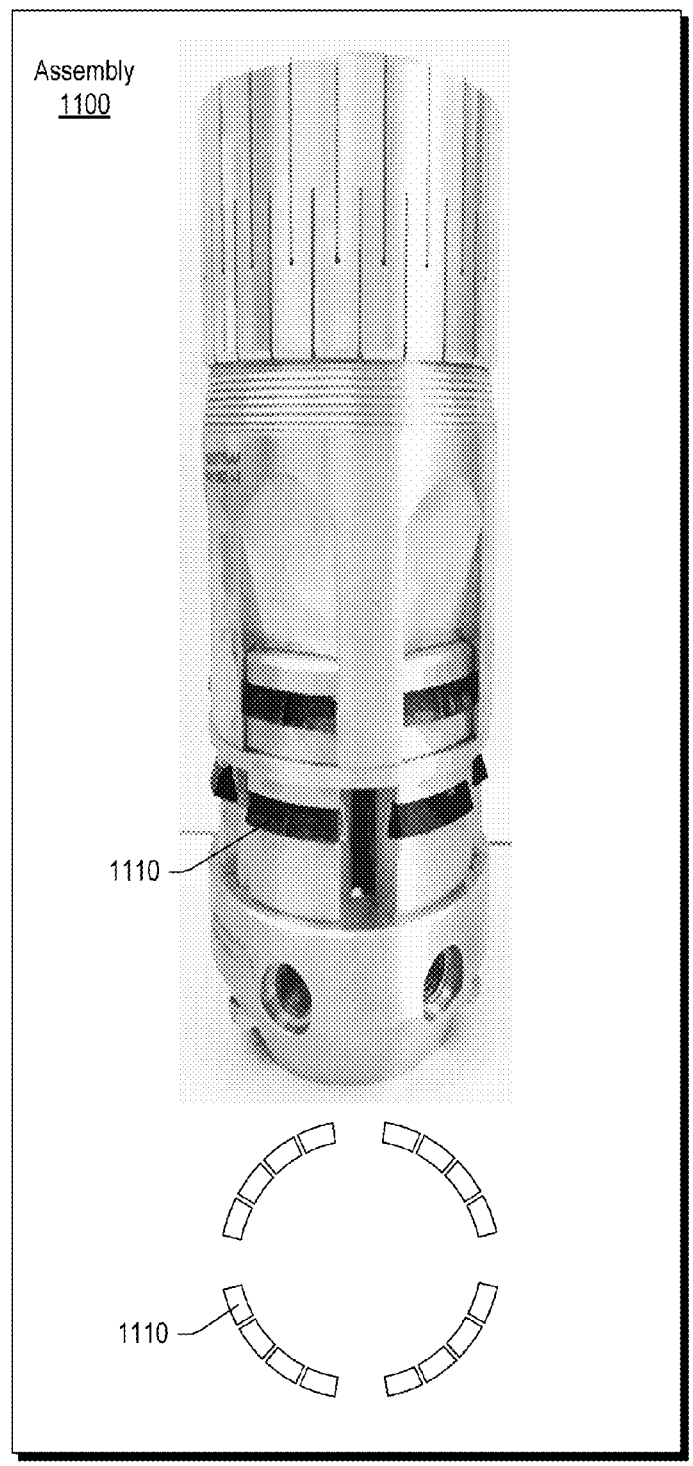
FIG. 11 illustrates examples of equipment.

FIG. 11 shows an example of an assembly 1100 that includes grips 1110. In the example of FIG. 11, one or more portions of the assembly 1100 can include degradable thermoset composite material.

As an example, equipment associated with one or more types of downhole operations can include one or more types of degradable components. As mentioned, a liner may be a casing (e.g., a completion component). As mentioned, a liner may be installed via a liner hanger system. As an example, a liner hanger system may include various features such as, for example, one or more of the features of the example assembly 1250 of FIG. 12.

Figure 12:
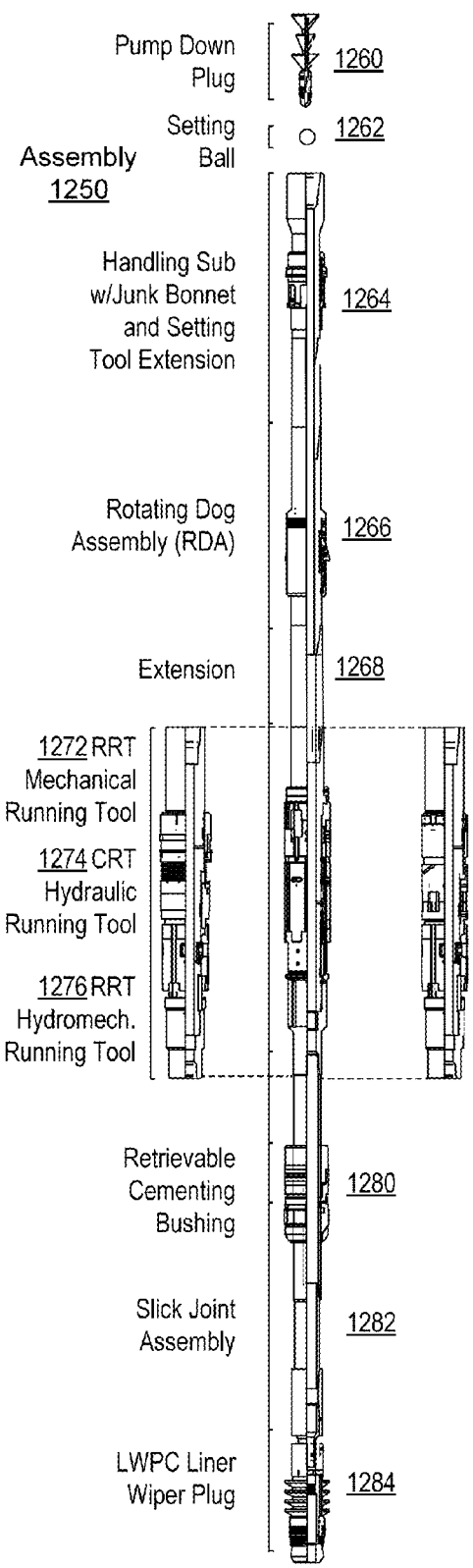
FIG. 12 illustrates examples of equipment.

As shown in FIG. 12, the assembly 1250 can include a pump down plug 1260, a setting ball 1262, a handling sub with a junk bonnet and setting tool extension 1264, a rotating dog assembly (RDA) 1266, an extension(s) 1268, a mechanical running tool 1272, a hydraulic running tool 1274, a hydromechanical running tool 1276, a retrievable cementing bushing 1280, a slick joint assembly 1282 and/or a liner wiper plug 1284.

As an example, a plug may be an object that can be seated, for example, to seal an opening. As an example, the pump down plug 1260 and the setting ball 1262 may be plugs. As an example, a plug tool may be a tool that includes at least one seat to seat a plug. For example, a plug tool may include a seat that can seat a plug shaped as a ball (e.g., a spherical plug), as a cylinder (e.g., a cylindrical plug), or other shaped plug.

As an example, an assembly may include a liner top packer with a polished bore receptacle (PBR), a coupling(s), a mechanical liner hanger, a hydraulic liner hanger, a hydraulic liner hanger, a liner(s), a landing collar with a ball seat, a landing collar without a ball seat, a float collar, a liner joint or joints and/or a float shoe and/or a reamer float shoe.

As an example, a method can include a liner hanger setting procedure. Such a procedure may include positioning a liner shoe at a depth at which a hanger is to be set, dropping a setting ball from a ball dropping sub of a cementing manifold, gravitating or pumping the ball down to a ball catch landing collar, reducing the pump rate when the ball is expected to seat, increasing pressure, which pressure may act through setting ports of a hanger body and set slips on to a casing, and while holding the hanger setting pressure, setting the liner hanger by slacking off the liner weight on the hanger slips, where a loss of weight may be indicated on a weight gauge as the liner hanger sets.

In the foregoing example, it may be desirable that the ball (see, e.g., the ball 1262) has properties suited for one or more operation or operations. Properties may include mechanical properties and may include one or more other types of properties (e.g., chemical, electrical, etc.). As an example, it may be desirable that the ball degrades. For example, a ball may be manufactured with properties such that the ball degrades when exposed to one or more conditions (e.g., consider environmentally-assisted cracking). In such an example, where the ball acts to block a passage, upon degradation, the passage may become unblocked. As an example, a ball or other component (e.g., a plug, etc.) may degrade in a manner that facilitates one or more operations.

As an example, a component or a portion of a component may degrade in stages. For example, consider a plug that degrades from a first size to a second smaller size. In such an example, the second smaller size may allow the plug to move (e.g., from a first seat to a second seat, etc.). As an example, a plug tool may be a degradable tool. As an example, a plug tool may be degradable in part (e.g., consider a frangible degradable plug). For example, consider a plug tool with a degradable seat or degradable seats. In such an example, a plug may be seated in a degradable seat that upon degradation of the seat, the plug may pass through the seat (e.g., become unplugged with respect to that seat). As an example, a system can include a plug tool that is degradable at least in part and one or more degradable plugs (e.g., balls, cylinders, etc.). As an example, a layer of a plug, a seat, etc., may be a degradable polymeric material layer.

Figure 13:
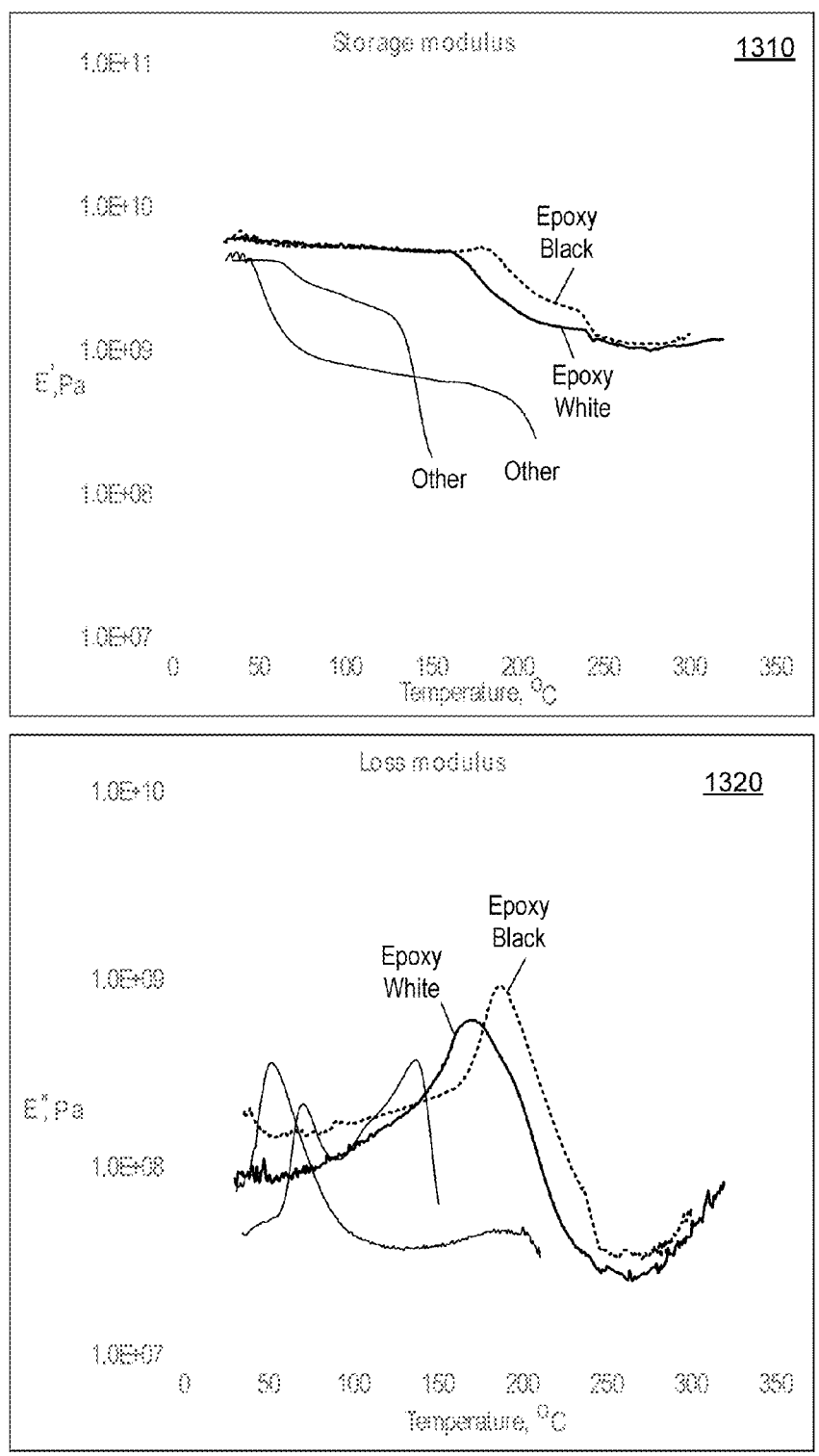
FIG. 13 illustrates example plots.

FIG. 13 shows example plots 1310 and 1320 for example thermoset epoxy composite materials, labeled black and white. The black example includes about 45 percent resin and has a Tg of about 196 degrees C. (DSC) while the white example includes about 57 percent resin and has a Tg of about 206 degrees C. (DSC). The plots 1310 and 1320 show that the black and white examples have a storage modulus that is relatively constant up to over 150 degrees C. The others are included for reference and include a thermoplastic PGA.

FIG. 14 shows before and after photographs for two different example materials 1410 and 1420 where the after photographs are after soaking in 3 percent KCl solution for 2 weeks at 200 degrees F. The material 1410 is a thermoset PLA and the material 1420 is a thermoset PLA-rubber, the latter lost about 40 percent of its mass while the former lost about 5 percent of its mass.

Figure 15:
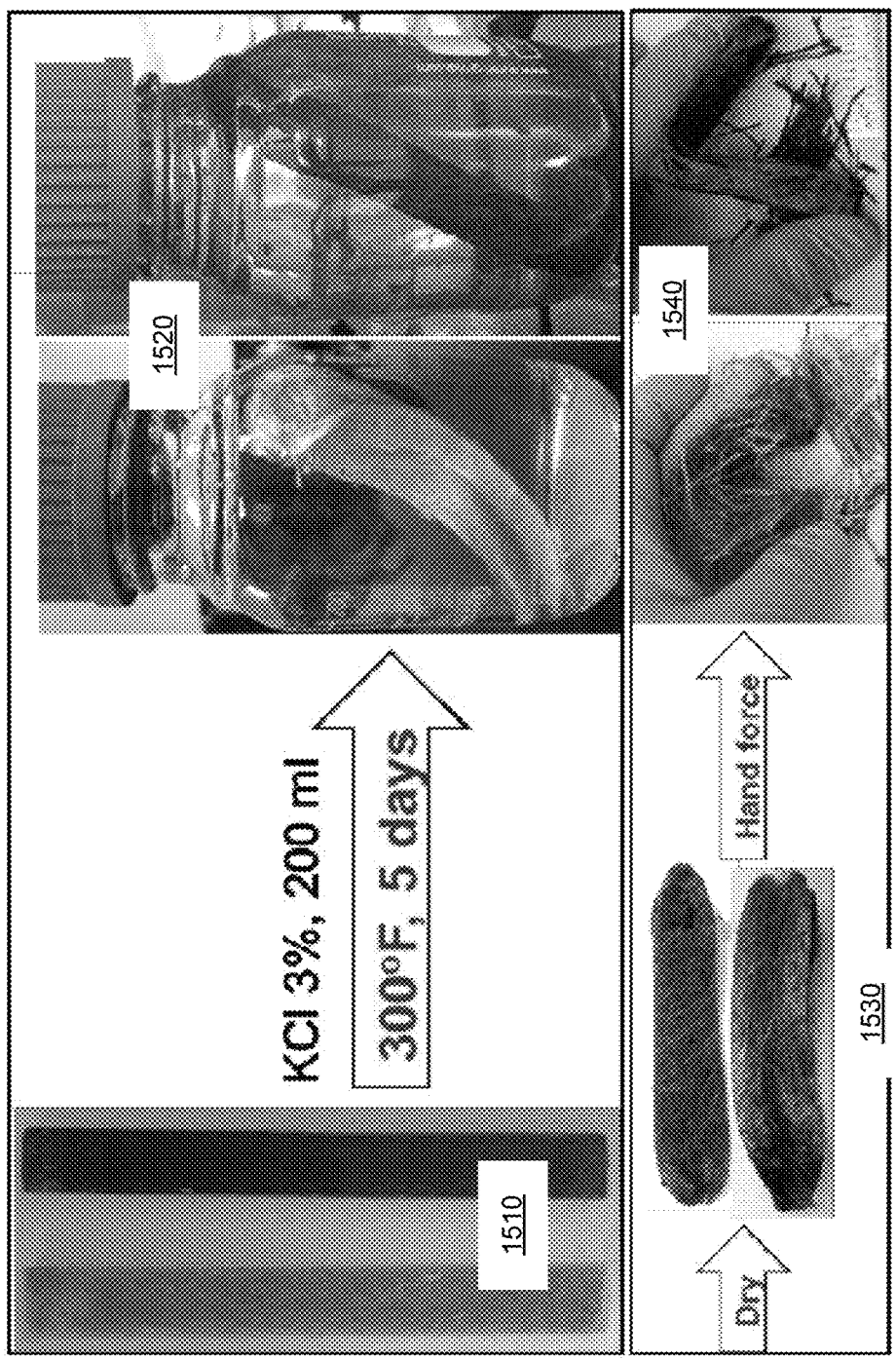
FIG. 15 illustrates an example method.

FIG. 15 shows photographs 1510, 1520, 1530 and 1540 for the black and white examples, which include E-glass fibers. When soaked at 200 degrees F. in 3 percent KCl for 5 hours, the examples were stable and when soaked at 300 degrees F. for 5 hours, the examples were relatively stable; whereas, soaking for 5 days at 300 degrees F. resulted in degradation.

FIG. 16 shows tables 1610 and 1620 that include numerical data for the black and white examples.

Figure 17:
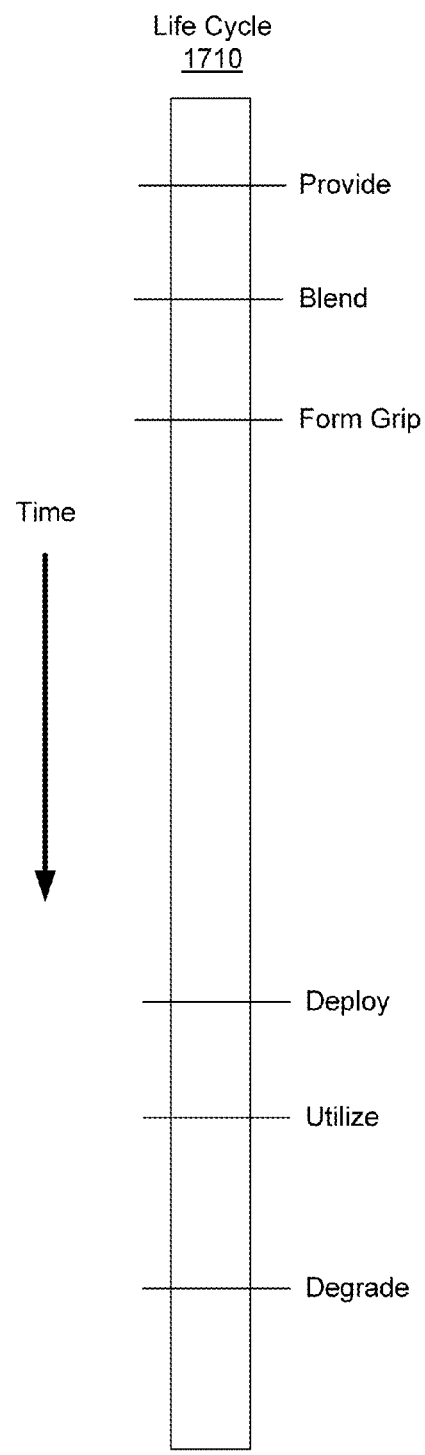
FIG. 17 illustrates an example of a life cycle.

FIG. 17 shows an example of a life cycle 1710. In the life cycle 1710, various times are illustrated as to stages or phases. For example, one or more materials may be provided, a blend may optionally be made of multiple materials, and a blend may be pressed via one or more processes. As an example, a finished, degradable component may be deployed, utilized and then, at least in part, degraded.

As an example, a degradable downhole component can include a thermoset composite material that includes a thermoset resin that includes crosslinks to a water-soluble polymer and fiber. In such an example, the thermoset resin can be an epoxy resin or epoxy resins. As an example, consider one or more aliphatic epoxy resin. As an example, a water-soluble polymer can include hydroxyl groups. As an example, a water-soluble polymer can be polyvinyl alcohol. As an example, a water-soluble polymer can be a water-soluble crosslinker that links to a thermoset resin. As an example, one or more water-soluble polymers may be utilized. As an example, fiber can be or include glass such as, for example, E-glass.

As an example, a fiber can include at least one filament that includes a length greater than approximately 10 cm. As an example, a degradable downhole can include at least one filament wound about an axis of the degradable downhole component.

As an example, a thermoset can include an epoxy, a water-soluble polymer can include hydroxyl groups and fiber can include E-glass.

As an example, a thermoset composite can be structurally degradable in a saline solution. As an example, a thermoset resin can have a substantially constant storage modulus in a temperature range from approximately 50 degrees C. to approximately 150 degrees C.

As an example, a degradable downhole component can have an initial compressive strength in excess of approximately 10,000 psi, 20,000 psi or 30,000 psi. As an example, the initial compressive strength can remains at least approximately 85 percent of the initial compressive strength after exposure to an aqueous 3 percent potassium chloride solution for approximately 5 hours at approximately 300 degrees F. As an example, initial compressive strength can decreases by at least 50 percent after exposure to an aqueous 3 percent potassium chloride solution for approximately 5 hours at approximately 350 degrees F.

As an example, a degradable downhole component can be a plug and/or a component of an assembly.

As an example, a method can include deploying a degradable component in a bore in a geologic formation where the degradable component includes a thermoset composite material that includes a thermoset resin that includes crosslinks to a water-soluble polymer and fiber; employing the degradable component in an operation in the bore; and degrading the degradable component via exposure to an aqueous fluid in the bore. A method may include forming the degradable component. As an example, employing can include exposing the degradable component to a pressure in excess of approximately 10,000 psi. As an example, degrading can include exposure to an aqueous fluid in the bore at a temperature greater than approximately 100 degrees C.

As an example, a component may be formed of material that provides a desired degradation rate and desired mechanical properties (e.g., strength, elasticity, etc.). As an example, a degradation rate may depend upon one or more conditions (e.g., temperature, pressure, fluid environments), which may be exist in an environment and/or may be achieved in an environment (e.g., via one or more types of intervention).

As an example, a degradable material may be suitable for use in an operation that may include stages. For example, consider a cementing operation, a fracturing operation, etc. As explained, a process may be associated with a completion where portions of the completion are constructed, managed, altered, etc. in one or more stages. For example, cementing may occur in stages that extend successively deeper into a drilled borehole and, for example, fracturing may occur in stages.

As an example, a component or a portion of a component may be used in a stage or stages of a fracturing operation. As an example, such a component or portion of a component may be used in a tensile-loaded application, for example, consider a bridge plug, etc. As an example, a bridge plug may be a tool, for example, a bridge plug tool. Such a tool may include one or more seats, which may, for example, provide for seating of one or more plugs.

As an example, a component formed from processed material may be a bridge plug. A bridge plug may be a downhole tool (e.g., a type of plug tool) that can be located and set to isolate a lower part of a wellbore. As an example, a bridge plug may be permanent, degradable, retrievable, etc. As an example, a bridge plug may be tailored to enable a lower wellbore to be permanently sealed from production or temporarily isolated, for example, from a treatment conducted on an upper zone. As an example, a bridge plug can include one or more degradable grips.

A part, a component, etc. constructed of a processed material or processed materials may include be a fluid sampling bottle, a pressure housing, a pump shaft, a cable (e.g., wireline, a power cable, etc.), a bridge plug tool, a projectile (e.g., a drop ball, a dart, etc.), a drill stem stabilizer, etc.

As an example, a method can include making a centralizer using processed material. For example, a centralizer may exhibit enhanced wear resistance that can reduce surface damage and corrosion fatigue on a borehole assembly (e.g., BHA), for example, thereby increasing BHA lifetime. As an example, via improved abrasion wear resistance of a centralizer, reliability may be improved, for example, when drilling over extended deviated lengths.

As an example, a borehole tool may be a tool that is part of a borehole assembly (e.g., "BHA") or borehole system. As an example, a BHA may be a lower portion of the drillstring, including (e.g., from a bottom up in a vertical well) a bit, a bit sub, optionally a mud motor, stabilizers, a drill collar, a heavy-weight drillpipe, a jarring devices (e.g., jars) and crossovers for various threadforms. As BHA may provide force for a bit to break rock (e.g., weight on bit), survive a hostile mechanical environment and provide a driller with directional control of a borehole. As an example, an assembly may include one or more of a mud motor, directional drilling and measuring equipment, measurements-while-drilling tools, logging-while-drilling tools or other borehole tools.

As an example, one or more methods described herein may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., consider a controller to control processing such as ECAP, cryomilling, extruding, machining, forming, cementing, fracturing, etc.). As an example, a computer-readable storage medium may be non-transitory and not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pressing process, a nitriding process, a sintering process, a pumping process, a heating process, etc.

Figure 18:
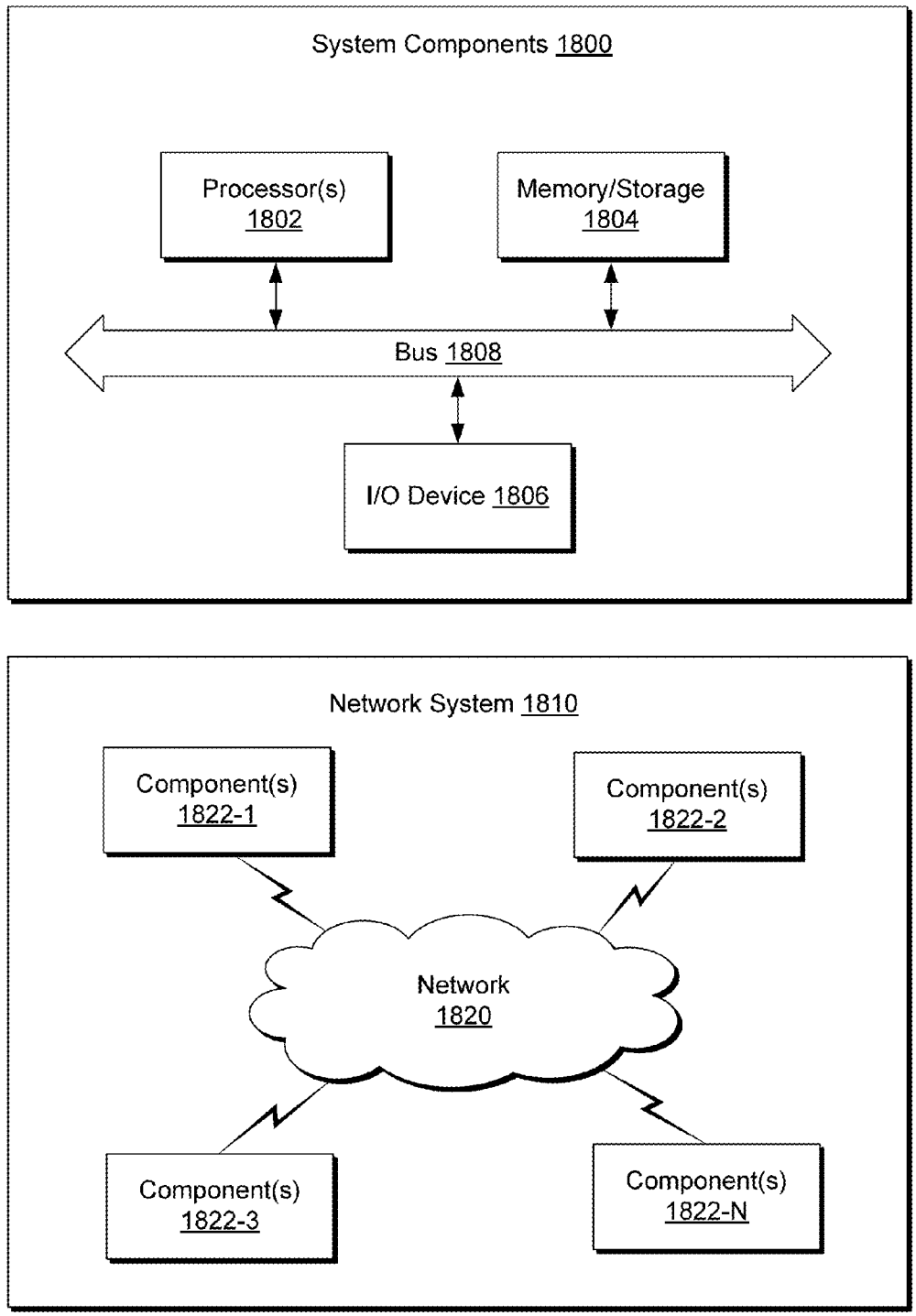
FIG. 18 illustrates example components of a system and a networked system.

FIG. 18 shows components of a computing system 1800 and a networked system 1810. The system 1800 includes one or more processors 1802, memory and/or storage components 1804, one or more input and/or output devices 1806 and a bus 1808. According to an embodiment, instructions may be stored in one or more computer-readable media (e.g., memory/storage components 1804). Such instructions may be read by one or more processors (e.g., the processor(s) 1802) via a communication bus (e.g., the bus 1808), which may be wired or wireless. As an example, instructions may be stored as one or more modules. As an example, one or more processors may execute instructions to implement (wholly or in part) one or more attributes (e.g., as part of a method). A user may view output from and interact with a process via an I/O device (e.g., the device 1806). According to an embodiment, a computer-readable medium may be a storage component such as a physical memory storage device, for example, a chip, a chip on a package, a memory card, etc.

According to an embodiment, components may be distributed, such as in the network system 1810. The network system 1810 includes components 1822-1, 1822-2, 1822-3, . . . , 1822-N. For example, the components 1822-1 may include the processor(s) 1802 while the component(s) 1822-3 may include memory accessible by the processor(s) 1802. Further, the component(s) 1822-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A degradable downhole component comprising:
   a thermoset composite material comprising: a thermoset resin that comprises crosslinks to a water-soluble polymer; and fiber,
   wherein the degradable downhole component comprises an initial compressive strength in excess of approximately 30,000 psi, and
   wherein the initial compressive strength remains at least approximately 30,000 psi after exposure to an aqueous 3 percent potassium chloride solution for approximately 5 hours at approximately 300 degrees F.

2. The degradable downhole component of claim 1 wherein the thermoset resin comprises an epoxy resin.

3. The degradable downhole component of claim 2 wherein the epoxy resin comprises an aliphatic epoxy resin.

4. The degradable downhole component of claim 1 wherein the water-soluble polymer comprises hydroxyl groups.

5. The degradable downhole component of claim 1 wherein the water-soluble polymer comprises polyvinyl alcohol.

6. The degradable downhole component of claim 1 wherein the fiber comprises E-glass.

7. The degradable downhole component of claim 1 wherein the fiber comprises at least one filament that comprises a length greater than approximately 10 cm.

8. The degradable downhole component of claim 1 wherein the fiber comprises at least one filament that comprises a length greater than approximately 10 cm.

9. The degradable downhole component of claim 1 wherein the thermoset comprises an epoxy, wherein the water-soluble polymer comprises hydroxyl groups and wherein the fiber comprises E-glass.

10. The degradable downhole component of claim 1 wherein the thermoset composite is structurally degradable in a saline solution.

11. The degradable downhole component of claim 1 wherein the thermoset resin comprises a substantially constant storage modulus in a temperature range from approximately 50 degrees C. to approximately 150 degrees C.

12. The degradable downhole component of claim 1 wherein the initial compressive strength decreases by at least 50 percent after exposure to an aqueous 3 percent potassium chloride solution for approximately 5 hours at approximately 350 degrees F.

13. The degradable downhole component of claim 1 comprising a plug.

14. The degradable downhole component of claim 1 comprising a component of an assembly.

15. A method comprising:
    deploying a degradable component in a bore in a geologic formation,
    wherein the degradable component comprises a thermoset composite material comprising: a thermoset resin that comprises crosslinks to a water-soluble polymer; and fiber, and
    wherein the degradable downhole component comprises an initial compressive strength in excess of approximately 30,000 psi, and
    wherein the initial compressive strength remains at least approximately 30,000 psi after exposure to an aqueous 3 percent potassium chloride solution for approximately 5 hours at approximately 300 degrees F.;

employing the degradable component in an operation in the bore; and degrading the degradable component via exposure to an aqueous fluid in the bore.

16. The method of claim 15 further comprising forming the degradable component prior to the deploying step.

17. The method of claim 15 wherein the employing step comprises exposing the degradable component to a pressure in excess of approximately 10,000 psi.

18. The method of claim 17 wherein the degrading step comprises exposure to an aqueous fluid in the bore at a temperature greater than approximately 100 degrees C.

* * * * *